(12) United States Patent
Wu et al.

(10) Patent No.: US 7,920,556 B2
(45) Date of Patent: Apr. 5, 2011

(54) METHOD FOR IMPROVING SUBSCRIBER ACCESS CAPACITY, BROADBAND ACCESS DEVICE AND NETWORK

(75) Inventors: Haijun Wu, Shenzhen (CN); Tao Yang, Shenzhen (CN); Lei Feng, Shenzhen (CN); Qili Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 804 days.

(21) Appl. No.: 11/610,004

(22) Filed: Dec. 13, 2006

(65) Prior Publication Data

US 2007/0147393 A1  Jun. 28, 2007

Related U.S. Application Data

(63) Continuation of application No. PCT/CN2005/001461, filed on Sep. 12, 2005.

(30) Foreign Application Priority Data

Sep. 10, 2004  (CN) .......................... 2004 1 0078853

(51) Int. Cl.
*H04L 12/28* (2006.01)
*H04L 12/56* (2006.01)
(52) U.S. Cl. ...................................... 370/389; 370/390
(58) Field of Classification Search .................. 370/389, 370/390
See application file for complete search history.

(56) References Cited

U.S. PATENT DOCUMENTS

| 7,447,203 B2 * | 11/2008 | Chen et al. ..................... 370/389 |
| 7,539,185 B2 * | 5/2009 | Shankar et al. ................ 370/389 |
| 2002/0075844 A1 | 6/2002 | Hagen |
| 2004/0032868 A1 | 2/2004 | Oda et al. |
| 2005/0013306 A1 * | 1/2005 | Albrecht .................. 370/395.53 |
| 2005/0138149 A1 * | 6/2005 | Bhatia ........................... 709/220 |

FOREIGN PATENT DOCUMENTS

| CN | 1426199 | 6/2003 |
| EP | 1 039 698 | 9/2000 |
| EP | 1351450 A2 | 10/2003 |
| EP | 1 667 369 | 6/2006 |
| JP | 2003/234753 | 8/2003 |
| WO | 2004/030281 | 4/2004 |

OTHER PUBLICATIONS

International Search Report for International Application No. PCT/CN2005/001461, mailed Dec. 22, 2005.
LiMin et al., "An IEEE 802.1Q-Based Management Protocol of Asymmetric VLAN," High Speed Networks and Multimedia Communications 5th IEEE International Conference, pp. 208-212 (2002).
Takagi et al., "GOE (Global Eopen Ethernet) Concept of Ethernet-Based Reliable, Scalable, and 'Plug & Play' VPN," NEC Journal of Advanced Technology, Graphic Media Business Division, 1(2):143-153 (2004).
Supplementary European Search Report for Application No. 05785041.4—2416, dated Jul. 31, 2007.

* cited by examiner

*Primary Examiner* — Ayaz R Sheikh
*Assistant Examiner* — Sori A Aga
(74) *Attorney, Agent, or Firm* — Leydig, Voit & Mayer, Ltd.

(57) ABSTRACT

A method for improving subscriber access capacity of a broadband access device is disclosed, including: establishing a Virtual Local Area Network Path Identifier (VlanPI) and corresponding VlanPI Tag, establishing a VLAN Circuit identifier (VlanCI) and corresponding VlanCI Tag for each access port of the broadband access device, dividing the access ports into groups and assigning the established VlanPIs to each group; then, before transmitting an ethernet frame, determining the VlanCI which corresponds to the access port and inserting the VlanCI Tag for identifying the VlanCI into the standard ethernet frame, determining the VlanPI corresponding to the group to which the access port belongs and inserting the VlanPI Tag which is used to identify the VlanPI into the standard ethernet frame, and transmitting the ethernet frame to an uplink device through an uplink port by the broadband access device which directly connects with the uplink device.

17 Claims, 3 Drawing Sheets

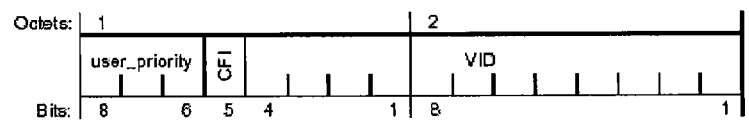
Fig. 1 (Prior Art)
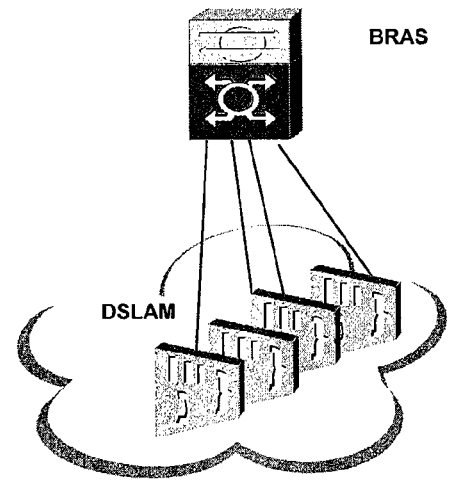
Fig. 2 (Prior Art)
Fig. 3

| Destination Address | Source Address | VlanPl Tag || VlanCl Tag || Etype | DATA | FCS |
|---|---|---|---|---|---|---|---|---|
| | | VlanPl Etype | VlanPl ID | VlanCl Etype | VlanCl ID | | | |

METHOD FOR IMPROVING SUBSCRIBER ACCESS CAPACITY, BROADBAND ACCESS DEVICE AND NETWORK

CROSS-REFERENCES TO RELATED APPLICATIONS

This is a continuation of International Application No. PCT/CN2005/001461, which was filed on Sep. 12, 2005, and which, in turn, claimed the benefit of Chinese Patent Application No. 200410078853.3, which was filed on Sep. 10, 2004, the entire disclosures of which are hereby incorporated herein by reference.

BACKGROUND OF THE INVENTION

1. Field of the Technology

The present invention relates to communication techniques, and more particularly, to a method for improving the subscriber access capacity of a broadband access device.

2. Background of the Invention

A Virtual Local Area Network (VLAN) is used to divide a physical network section of a Local Area Network (LAN) into multiple virtual LAN network sections. The VLAN makes it possible to divide work groups based not only on physical locations but also on functions, applications or protocols as well, which improves flexibility and convenience of networking.

For the convenience of application, implementation of the VLAN in an Ethernet is regulated in 802.1Q (Virtual Bridged Local Area Networks) which is issued by Institute of Electrical and Electronics Engineers (IEEE). According to the regulations of 802.1Q, a 4-byte 802.1Q tag is added to a standard ethernet frame following source MAC address. FIG. 1 is a diagram illustrating a standard 802.1Q frame format, where—

Destination Address is a MAC address with 4 bytes,
Source Address is a MAC address with 4 bytes,
802.1Q tag is a 802.1Q tag field with 4 bytes,
Length/type is the length of data or the type of the ethernet frame with 2 bytes,
DATA is the data field carried by the Ethernet,
and Frame Check Sum (FCS) is a checksum of the ethernet frame.

The 802.1Q tag added to the ethernet frame specifically includes: a 2-byte Tag Protocol Identifier (TPID) and a 2-byte Tag Control Information (TCI). The TPID, a new type defined by the IEEE and of which the value is a hexadecimal value of 8100, is used to identify the ethernet frame as an ethernet frame with an 802.1Q tag.

The detailed architecture of the TPID in the 802.1Q tag is shown in FIG. 2, where a Virtual Local Area Network Identifier (VID/VLAN ID) which is a 12-bit field used to identify different VLANs, and the value of the VID/VLAN ID ranges from 0 to 4095 so as to make 4096 VLANs be differentiated by different values. Each data frame sent by a device supporting 802.1Q protocol includes the TPID field to identify the VLAN to which it belongs.

Based on the above-mentioned regulations, in current broadband access networks, the broadband access device maps the location information of an accessing subscriber to the VLAN information of the 802.1Q and transmits, through the 802.1Q tag field carried by the data frame, the VLAN information of the 802.1Q acquired by mapping to a Broadband Remote Access Server (BRAS) device. The location information of the accessing subscriber can be an access port a Permanent virtual circuit (PVC), etc. When a subscriber authentication is completed, the BRAS is able to locate the subscriber according to the identifier (e.g. the hostname) of the BRAS itself, the slot number and the port number via which the broadband access device is connected to the BRAS, and the VLAN ID in the data frame of the subscriber.

However, as the VLAN ID field of the 802.1Q tag header has only 12 bits, 4096 VLANs can be identified at most. In a network in which a broadband access device and a BRAS device are networked directly, a continual enlargement of the scale of a single-node broadband access device enables the device to support more than 4096 subscriber access points. Moreover, a method adopting a cascading access solution to save fibers can result in high capacities access points with more than 4096 subscriber access capability. In such a case, 4096 VLANs are not enough to identify different subscribers.

In addition, since device manufactures and chip manufactures in the Industry have different focus on the 802.1Q, there are differences in supporting the 802.1Q standard. For example, although some lanswitch chipsets have unique features in providing some services, they do not support the identification of all the 4096 VLAN IDs, for instance, some chipsets only support the identification of 256 VLAN IDs. In such a case, the number of the subscriber access points which can be identified is much less.

SUMMARY OF THE INVENTION

A method for improving subscriber access capacity of a broadband access device is provided, which may not only enable the broadband access device support the access of more than 4096 subscribers but also reduce the number of direct-connecting fibers between a Broadband Remote Access Server (BRAS) device and a broadband access device, thereby may reduce the cost.

The method in accordance with the embodiments of the present invention specifically includes:

establishing at least one Virtual Local Area Network Path Identifier (VlanPI) and corresponding VlanPI Tag;
establishing a VLAN Circuit Identifier (VlanCI) and a corresponding VlanCI Tag for each access port of the broadband access device;
dividing the access ports into groups and assigning the established VlanPI to each group;
determining a VlanCI which corresponds to an access port, inserting the VlanCI Tag for identifying the VlanCI into an ethernet frame;
determining the VlanPI corresponding to the group to which the access port belongs, inserting the VlanPI Tag for identifying the VlanPI, into the ethernet frame; and
transmitting the ethernet frame to an uplink device through an uplink port by the broadband access device which connects with the an uplink device.

A broadband access network system, including a broadband access device and a broadband access server, the broadband access network system further includes:

a first device for establishing at least one Virtual Local Area Network Path Identifier (VlanPI) and corresponding VlanPI Tag;
a second device for establishing a VLAN Circuit Identifier (VlanCI) and a corresponding VlanCI Tag for each access port of the broadband access device;
a third device for dividing the access ports into groups and assigning the established VlanPI to each group;
a fourth device for determining the VlanCI which corresponds to the access port, inserting the VlanCI Tag for identifying the VlanCI into an ethernet frame;

a fifth device for determining the VlanPI corresponding to the group to which the access port belongs, inserting the VlanPI Tag for identifying the VlanPI into the ethernet frame; and a sixth device for transmitting the ethernet frame to the broadband access server through an uplink port by the broadband access device.

A broadband access device, includes:

device for establishing a Virtual Local Area Network Circuit Identifier (VlanCI) and a corresponding VlanCI Tag for each access port of the broadband access device;

device for establishing one VLAN Path Identifier (VlanPI) and corresponding VlanPI Tag for each cascaded port of the broadband access device;

device for dividing the access ports into groups and assigning the established VlanPI to each group.

Compared with the prior art, the ability to identify an accessing subscriber is added by inserting multiple tag fields into the ethernet frame. Since the VlanPI identifier and the VlanCI identifier are combined to identify the user access ports in groups, the subscriber access capacity of the broadband access device has been increased, thereby the broadband access device may be able to support the access of more than 4096 subscribers. When the broadband access device selects some network switching chips which have excellent performance but limited ability to support the number of VLANs, the solution in accordance with the embodiments of the present invention can make the device support at least 4096 VLANs.

When the broadband access device is in a cascading application, the ethernet frame with the VlanPI Tag, which is from the cascading interface, can be identified. The standard 802.1Q ethernet frame can be forwarded in the way in which the VlanPI and the VlanCI are processed, that is, it need not to be forwarded through the Vlan ID and MAC address. As a result, it is not needed to learn the Vlan ID and the MAC address. When the uplink device can identify the VlanPI Tag, only an uplink port needs to be configured. Therefore, the number of direct-connecting fibers between the BRAS device and the broadband access device is reduced, thereby the cost reduced.

BRIEF DESCRIPTION OF THE DRAWINGS

FIG. 1 is a schematic diagram illustrating the format of an ethernet frame with an 802.1Q tag;

FIG. 2 is a schematic diagram illustrating detailed contents of the 802.1Q tag;

FIG. 3 is a schematic diagram illustrating a system which improves the access capability by increasing the number of cascaded DSLAMs;

DETAILED DESCRIPTION OF THE PREFERRED EMBODIMENTS

Figures 4, 5:
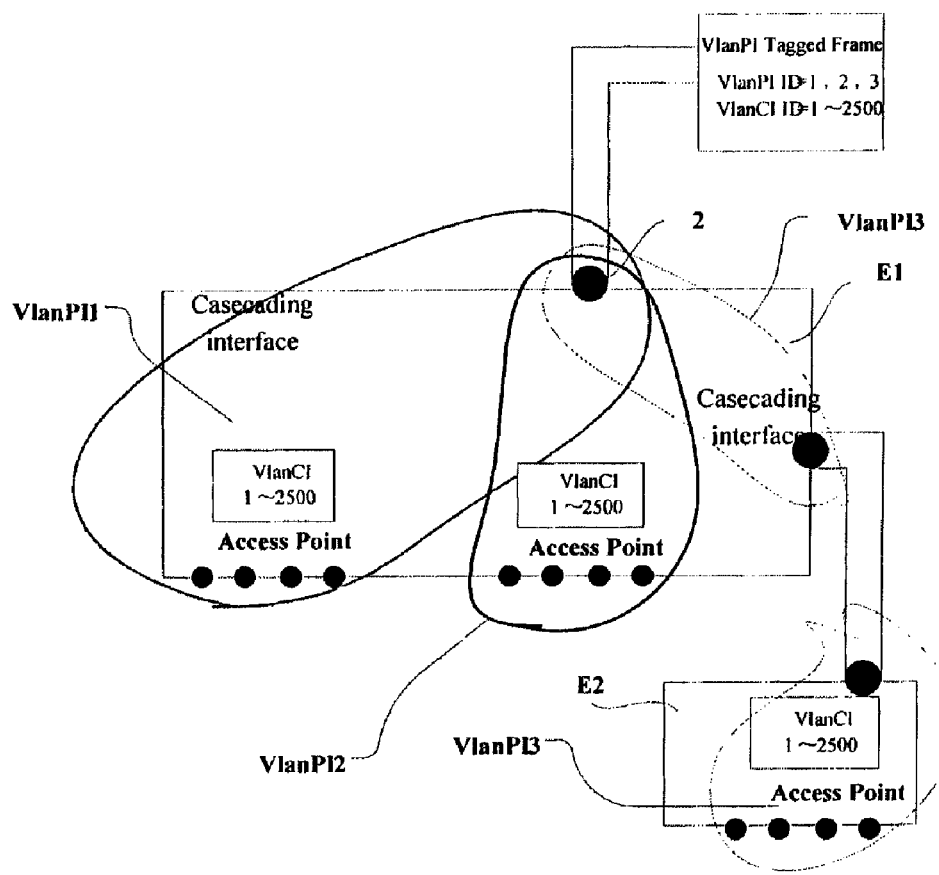
FIG. 4 is a schematic diagram illustrating the format of a frame inserted with a Virtual Local Area Network Path Identifier (VlanPI) Tag and a Virtual Local Area Network Circuit Identifier (VlanCI) Tag in accordance with an embodiment of the present invention.
FIG. 5 is a schematic diagram illustrating an embodiment of the present invention.

To solve the problem that it is impossible to identify the subscribers if the number of the subscribers is more than 4096, a method in which multiple Digital Subscriber Line Access Multiplexers (DSLAMs) are cascaded directly under the BRAS device can be adopted. Supposing the DSLAM is used as the broadband access device, as shown in FIG. 3, since each DSLAM device can support the identification of 4096 subscribers, an identification of 4096×N subscribers can be supported if N DSLAM devices are cascaded under the BRAS device.

It can be seen from the solution illustrated in FIG. 3 that each broadband access device can only identify 4096 subscribers at most because each broadband access device of the access point can only identify 4096 VLANs at most. If the access point needs to provide extra-large capacities, for example, there are more than 4096 subscribers accessing due to the reason that some cascading devices are cascaded under the access point, the number of the broadband access devices has to be increased. Thus, device cost is increased as the number of the broadband access devices is increased and the number of the direct-connecting fibers between the BRAS device and the broadband access device is increased as well, thereby making the cost higher.

When a broadband access device is used in networking, it generally uses a Fast Ethernet (FE) port or a Gigabit Ethernet (GE) port to connect with an uplink device (such as the BRAS device, etc) or a cascading device (such as other Digital Subscriber Line Access Multiplexer (DSLAM) and LAN-SWITCH, etc). The subscriber accesses the broadband access device through an Asymmetrical Digital Subscriber Loop (ADSL) port, a Very High Speed Digital Subscriber Loop (VDSL) or a FE port. To make the description of the technical solution simply, in the embodiments of the present invention the port on the broadband access device and connecting with an upper-level device is called "uplink port" for short, the port which connects with a cascading device is called "cascading interface", and the port through which the subscriber accesses is called "access port".

A detailed description of the embodiments of the present invention is given hereinafter with reference to the drawings.

One or more VLAN Path Identifiers (VlanPI) equivalent to the Virtual Path Identifiers (VPIs) in the Asynchronous Transfer Mode (ATM) technique are established in a system. A VLAN Circuit Identifier (VlanCI) which is equivalent to a Virtual Circuit Identifier (VCI) in the ATM technique is established for each access port. The access ports of a broadband access device in the system are divided into groups and the established VlanPIs are assigned to each group.

The size of the above-mentioned VlanPI Tag can be configured to be 4 bytes, which includes two parts: VlanPI Etype and VlanPI ID. The first 2 bytes are VlanPI Etype of which the value can be configured as 0×8100. VlanPI ID occupies the last 12 bits of the latter two bytes which value can be configured within the range from 0 to 4095. The specific value of VlanPI ID can be allocated for identifying different VlanPIs when the system establishes the VlanPI. The VlanPI ID can be configured to occupy less than 12 bits. As a result, the number of the VLANs which can be supported will be reduced.

The size of the above-mentioned VlanCI Tag can be configured to be 4 bytes, and the VlanCI Tag includes two parts: VlanCI Etype and VlanCI ID. The VlanCI Etype, of which the value can be configured as 0×8100 or other values, occupies the first 2 bytes. The VlanCI ID, of which the value can be configured within the range from 0 to 4095, occupies the last 12 bits in the last 2 bytes with its specific value configured to correspond to a Port Vlan ID (PVID) of the corresponding access port.

An ethernet frame into which the VlanPI Tag and the VlanCI Tag are inserted is shown in FIG. 4.

After the above-mentioned configurations have been finished, the VlanCI which corresponds to the current access port can be determined, and the VlanCI Tag for identifying the VlanCI is inserted into a standard ethernet frame. The VlanPI corresponding to the group where the current access port is located is determined, the VlanPI Tag for identifying the VlanPI is inserted into the standard ethernet frame and the ethernet frame is transferred transparently to an uplink device through an uplink port.

The steps of determining the VlanCI which corresponds to the access port and inserting the VlanCI Tag can be implemented by the broadband access device which the access port belongs to. The steps of determining the VlanPI which corresponds to the group where the access port is located and inserting the VlanPI Tag can be implemented by the broadband access device which the access port belongs to, or can be implemented by the uplink broadband access device of the broadband access device which the access port belongs to.

In addition, since there can be multiple access devices cascaded under the broadband access device, a cascading interface can be configured to correspond to a specific VlanPI. In this way, in a cascaded networking mode, a cascading device can configure the VlanPI Tag in a message directly. If a message from the cascading device has no VlanPI Tag, the broadband access device needs to determine the VlanPI which corresponds to the cascading device and add a VlanPI Tag and a VlanCI Tag to the message. Obviously, if the VlanPI configured in local is different from the VlanPI carried by the message from the cascading device, the message will be discarded. When the broadband access device sends a message, the message carrying the VlanPI Tag and the VlanCI Tag can be transmitted through any uplink port. Alternatively, a corresponding relationship between a VlanPI and an uplink port can be configured in advance, and the message will be forwarded through a corresponding uplink port according to the VlanPI ID value in the message and the corresponding relationship configured between the VlanPI and the uplink port.

Actually, in some cases, it is not necessary for the broadband access device to configure the VlanPI Tag and the VlanCI Tag, for instance, when the number of VLANs which are supported by the broadband access device can satisfy subscribers' requirements. In such cases, it can be configured in advance whether it is needed to transparently transfer the VlanPI Tag and the VlanCI Tag to the uplink device. And then, when the broadband access device transmits an Ethernet message, if the broadband access device is configured not to transparently transfer the VlanPI Tag and the VlanCI Tag to the uplink device and the information of the VlanPI Tag, and the information of the VlanCI Tag have been configured in the Ethernet message, the VlanPI Tag and the VlanCI Tag in the ethernet frame will be deleted and a standard 802.1Q Tag will be added to the frame. The VLAN ID in the 802.1Q Tag equals to the VlanCI ID. In this way, for the uplink device, the message sent from the uplink port of the broadband access device is in the standard 802.1Q format. Similarly, if this device is configured not to transparently transfer the VlanPI Tag and the VlanCI Tag to the uplink device and there is only the VlanCI Tag configured in the Ethernet message, the broadband access device which connects directly with the uplink device needs not implement the step of inserting the VlanPI Tag, only performing the steps of deleting the VlanCI Tag in the ethernet frame and adding the standard 802.1Q tag to the standard ethernet frame.

There can be one or more uplink ports in one broadband access device. If the uplink device can identify the VlanPI Tag, just one uplink port is able to support the access of more than 4096 subscribers because the access ports of different groups can be identified directly by different VlanPI Tags. Even if the message is transmitted through the same uplink port, the uplink device can differentiate different messages through the VlanPI Tag, thereby saving the number of fibers between the broadband access device and the uplink device.

For example, as shown in FIG. 5, the uplink device supports the identification of VlanPI and supports the cascaded application of broadband access devices E1 and E2. The broadband access device E2, of which the number of accessing subscribers is small and the bandwidth requirement is not high, connects with broadband access device E1 through a Fast Ethernet (FE) interface. Uplink port 2 of broadband access device E1 connects with the BRAS which is the uplink device. There are 3 VlanPIs established in this embodiment, and the access ports of E1 are divided into two groups, which corresponds to (VlanPI 1, VlanCI 1□2500) and (VlanPI 2, VlanCI 1~2500), respectively. The VlanPI and the VlanCI which correspond to the subscribers accessed by E2 which is connected with E1 are (VlanPI 3, VlanCI 1~2500). For the BRAS device, all the ethernet frames are from 3 VlanPIs of broadband access device E1 through the above-mentioned configurations, and it is only needed for the BRAS device and E1 to connect with each other through the uplink port 2, that is, only one pair of fibers is needed for the BRAS device and E1 to communicate. Furthermore, the more the cascaded broadband access devices, the more evident the advantage of saving fibers.

If the uplink device can not identify a VlanPI Tag, multiple uplink ports must be configured, the number of which is at least the same as the number of the VlanPIs. Then reason is that although the uplink device can not identify VlanPI Tags, it can still identify uplink ports. The message transmitted between the broadband access device and the cascading device can still be identified through the VlanPI and the VlanCI, that is, 4096 or more messages can be supported between the broadband access device and the cascading devices. As a result, if a corresponding VlanPI Tag is configured for each uplink port, or in other word, each uplink port is bound with a VlanPI, the uplink device can receive corresponding messages through the uplink ports and differentiate different messages. If each uplink port is bound with a VlanPI, before the broadband access device transmits a message to the uplink device through an uplink port, it is needed to delete the VlanPI Tag and the VlanCI Tag in the message and add a 802.1Q standard tag to it, and the VlanID of the 802.1Q tag can be the same as the VlanCI ID.

In addition, if the number of VlanPI is relatively small and there are multiple uplink ports in the broadband access device, it is allowed not to transmit the VlanPI Tag and the VlanCI Tag to the uplink device. Instead, the VlanPI is bound with an uplink port and an 802.1Q standard tag is added to the ethernet frame. The VlanID of the 802.1Q tag is the same as the VlanCI ID. The uplink device then receives corresponding message through the uplink port.

Figure 6:
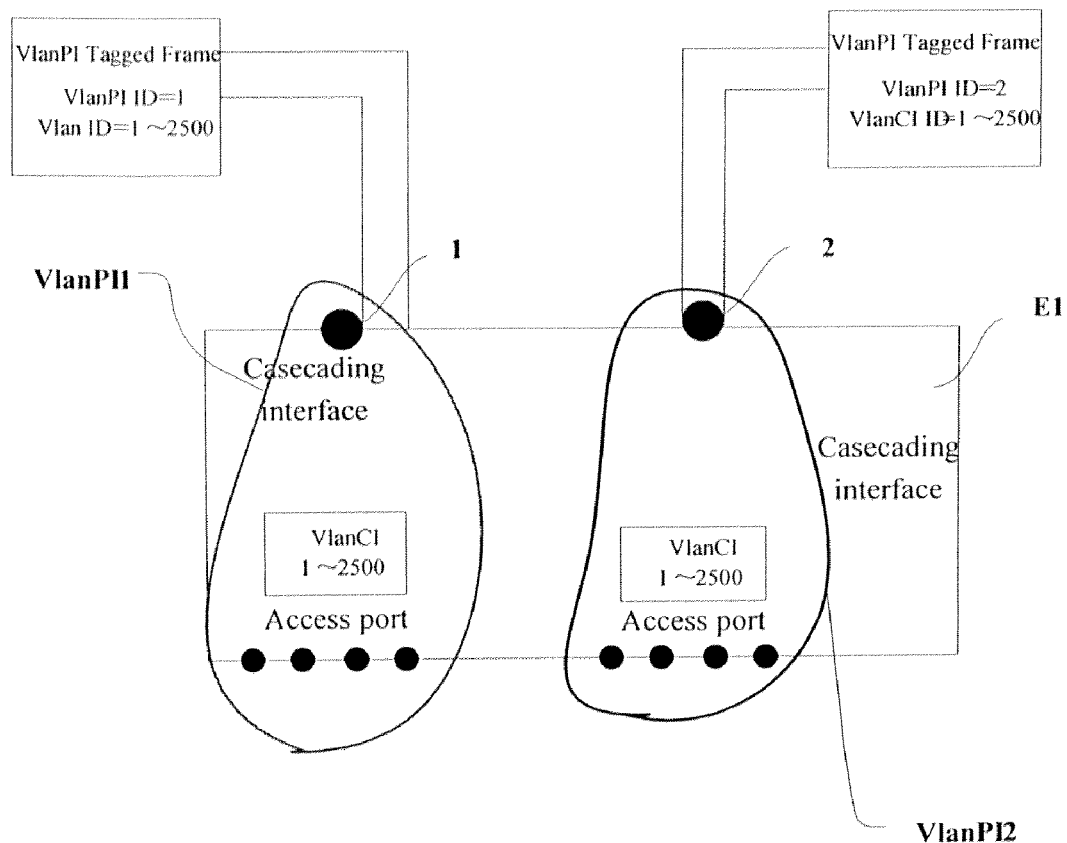
FIG. 6 is a schematic diagram illustrating another embodiment of the present invention.

For instance, as shown in FIG. 6, if the broadband access device needs to support the access of 5000 subscribers, two uplink ports can be configured to establish two VlanPIs. Since there are only two VlanPIs, the VlanPIs may not be transparently transferred to the uplink device. Instead, a binding relationship between the uplink port and the VlanPIs is configured, for example, uplink port 1 is configured to bind with VlanPI1 and uplink port 2 is configured to bind with VlanPI2. And 5000 access ports are divided into two groups, i.e., 1~2500 and 2501~5000. Each group is configured with one VlanPI, for instance, VlanPI1 is configured for access ports 1~2500 and VlanPI2 is configured for access ports 2501~5000. Each access port needs to be further configured to correspond to one VlanCI, making each of access ports 1~2500 correspond to a different VlanCI and making each of access ports 2501~5000 correspond to a different VlanCI as well. As the VlanPI corresponding to access ports 1~2500 is different from the VlanPI corresponding to access ports 2501~5000, the VlanCIs corresponding to access ports 1~2500 can be identical with VlanCIs corresponding to access ports 2501~5000. In this way, the messages from access ports 1~2500 can be transmitted to the uplink device through uplink port 1 while the messages from access ports 2501~5000 can be transmitted to the uplink device through uplink port 2, and the messages carry Vlan ID, but no VlanPI Tag or VlanCI Tag.

If the switching chip used by the broadband access device can not identify 4096 VLANs, the access ports can be divided into different groups with each group corresponding to one VlanPI. Then VlanCIs can be assigned to each access port. In this way, the broadband access device is enabled to support at least 4096 VLANs by configuring the VlanPI and the VlanCI, and the VlanCIs corresponding to access ports in different groups can be the same. Furthermore, when the access ports are divided into groups, the access ports of one switching chip can be put into one group.

A detailed example is as follows. Supposing that the network switching chips used by a service board of the broadband access device can only support 256 VLANs, then, the access ports belonging to each chip can be categorized into one group, and moreover, each group corresponds to one VlanPI and each port corresponds to one VlanCI. In this way, at least 4096 VLANs can be supported. Moreover, if it is configured not to transparently transfer the VlanPI, before the broadband access device transmits the message, the VlanPI Tag and the VlanCI Tag are deleted, a standard 802.1Q Tag is configured, and the Vlan ID value in the 802.1Q tag can be equal to the value of the VlanCI ID. In this way, for the uplink device, the data frame from the broadband access device is a standard 802.1Q frame, and the broadband access device can support at least 4096 VLANs.

The foregoing descriptions are only preferred embodiments of the present invention and not used for limiting the protection scope thereof. Any changes and modifications may be made in light of the foregoing description by those skilled in the art without departing from the principle and spirit of this invention and therefore should be covered within the protection scope of this invention as set by the appended claims.

What is claimed is:

1. A method for improving subscriber access capacity of a broadband access device comprising a plurality of access ports, comprising:
establishing at least one Virtual Local Area Network Path Identifier (VlanPI) and corresponding VlanPI Tag;
establishing one VLAN Circuit Identifier (VlanCI) and one corresponding VlanCI Tag for each of the plurality of access ports of the broadband access device;
dividing the plurality of access ports into groups and assigning the established VlanPI to each group, wherein one VlanPI Tag and one VlanCI Tag are established to be combined to identify one of the plurality of access ports and to be inserted into at least one ethernet frame, different groups correspond to different VlanPI Tags, and a VlanCI corresponding to a first group of the groups can be identical with a VlanCI corresponding to a second group of the groups, wherein the broadband access device comprises multiple network switching chips, and the step of dividing the plurality of access ports into groups comprises: categorizing access ports belonging to each network switching chip into one group which corresponds to one Vlan PI;
determining a VlanCI which corresponds to an access port, inserting the VlanCI Tag for identifying the VlanCI into an ethernet frame;
determining a VlanPI corresponding to a group to which the access port belongs, inserting a VlanPI Tag for identifying the VlanPI into the ethernet frame; and
transmitting the ethernet frame tagged with the VlanCI Tag and the VlanPI Tag to an uplink device through an uplink port by the broadband access device which connects with the uplink device.

2. The method according to claim 1, wherein information in the VlanPI Tag field comprises information of VlanPI Etype and information of VlanPI identifier (VlanPI ID); and
wherein information of the VlanCI Tag field comprises information of VlanCI Etype and information of VlanCI ID.

3. The method according to claim 2, wherein the information of VlanPI Etype is a hexadecimal value of 0×8100; and the information of VlanPI ID is a 12-bit binary number, of which the decimal value ranges from 0 to 4095.

4. The method according to claim 2, wherein the information of VlanCI Etype is a hexadecimal value of 0×8100; and the information of VlanCI ID is a 12-bit binary number, of which the decimal value ranges from 0 to 4095 and the specific value corresponds to the Port Vlan ID (PVID) of the access port.

5. The method according to claim 1, wherein the steps of determining a VlanCI which corresponds to an access port, and inserting the VlanCI Tag for identifying the VlanCI into an ethernet frame comprise: the broadband access device that the access port belongs to determining the VlanCI and inserting the VlanCI Tag into the Ethernet frame;
wherein the steps of determining the VlanPI which corresponds to the group to which the access port belongs and inserting the VlanPI Tag comprise at least one of:
(i) the broadband access device that the access port belongs to determining the VlanPI and inserting the VlanPI Tag into the Ethernet frame; and
(ii) the uplink broadband access device of the broadband access device to which the access port belongs determining the VlanPI and inserting the VlanPI Tag.

6. The method according to claim 1, wherein the broadband access device that the access port belongs to inserting the VlanPI Tag and the VlanCI Tag into the Ethernet frame, the access port is cascaded to the broadband access device connecting with an uplink device; and further comprises:
judging whether the VlanPI Tag comprised in the ethernet frame belongs to the established VlanPI, if the VlanPI Tag belongs to the established VlanPI, transmitting the ethernet frame to the uplink device; otherwise, discarding the message.

7. The method according to claim 1, wherein for an ethernet frame in which the VlanCI Tag has been inserted and the VlanPI Tag is to be inserted, the VlanPI Tag is inserted into the ethernet frame by the broadband access device connecting with the uplink device;
before inserting the VlanPI Tag into the Ethernet frame, judging whether the broad access device is configured to transmit the VlanPI Tag and the VlanCI Tag to the uplink device, if the broad access device is configured to transmit the VlanPI Tag and the VlanCI Tag to the uplink device, inserting the VlanPI Tag into the Ethernet frame and transmitting the VlanPI Tag and the VlanCI Tag to the uplink device; otherwise, deleting the VlanCI Tag in the ethernet frame, adding a 802.1 Q Tag to the ethernet frame and transmitting the ethernet frame to the uplink device.

8. The method according to claim 7, wherein the Vlan ID of the 802.1 Q Tag added to the ethernet frame is the same as the VlanCI ID in the VlanCI Tag.

9. The method according to claim 1, further comprising:
configuring uplink ports with each uplink port corresponding to one VlanPI, wherein, the number of the configuring uplink ports is at least the same as the number of the VlanPI;
determining the uplink port corresponding to the VlanPI Tag in the Ethernet frame, deleting the VlanPI Tag and the VlanCI Tag in the Ethernet frame if each of the uplink ports is bound to one VlanPI, adding a 802.1 Q Tag and transmitting the ethernet frame to the uplink device through the determined uplink port.

10. A broadband access network system, comprising a broadband access device and a broadband access server, the broadband access device comprising a plurality of access ports,
the broadband access network system further comprising:
a first device for establishing at least one Virtual Local Area Network Path Identifier (VlanPI) and corresponding VlanPI Tag;
a second device for establishing one VLAN Circuit Identifier (VlanCI) and one corresponding VlanCI Tag for each of the plurality of access ports of the broadband access device;
a third device for dividing the plurality of access ports into groups and assigning the established VlanPI to each group, wherein one VlanPI Tag and one VlanCI Tag are established to be combined to identify one of the plurality of access ports and to be inserted into at least one ethernet frame, different groups correspond to different VlanPI Tags, and a VlanCI corresponding to a first group of the groups can be identical with a VlanCI corresponding to a second group of the groups, wherein the broadband access device comprises multiple network switching chips, access ports belonging to each network switching chip being categorized into one group which corresponds to one VlanPI;
a fourth device for determining a VlanCI which corresponds to the access port and inserting the VlanCI Tag for identifying the VlanCI into an ethernet frame;
a fifth device for determining a VlanPI corresponding to a group to which the access port belongs and inserting a VlanPI Tag for identifying the VlanPI into the ethernet frame; and
a sixth device for transmitting the ethernet frame to the broadband access server through an uplink port by the broadband access device.

11. The broadband access network system according to claim 10, wherein the fourth device and the fifth device belong to the broadband access device.

12. The broadband access network system according to claim 10, wherein the fourth device belongs to the broadband access device, and the fifth device belongs to the broadband access server.

13. A broadband access device having a plurality of access ports and multiple cascaded ports, comprising:
multiple network switching chips, access ports belonging to each network switching chip being categorized into one group which corresponds to one VLAN Path Identifier (VlanPI);
a device for establishing one Virtual Local Area Network Circuit Identifier (VlanCI) and one corresponding VlanCI Tag for each of the plurality of access ports of the broadband access device; and
a device for establishing one VlanPI and corresponding VlanPI Tag for each of the multiple cascaded ports of the broadband access device;
a device for dividing the access ports into groups and assigning the established VlanPI for each of the multiple cascaded ports to each group, wherein one VlanPI Tag and one VlanCI Tag are established to be combined to identify one of the plurality of access ports and to be inserted into at least one ethernet frame, different groups correspond to different VlanPI Tags, and a VlanCI corresponding to a first group of the groups can be identical with a VlanCI corresponding to a second group of the groups.

14. The broadband access device according to claim 13, wherein the cascaded port is an uplink port connected with an uplink device.

15. The broadband access device according to claim 13, wherein the cascaded port is a downlink port connected with a downlink device.

16. The broadband access device according to claim 14, wherein the number of the uplink port is at least the same as the number of the VlanPI, and messages transmitted between the broadband access device and other device connected with the broadband access device can be identified through the VlanPI and the VlanCI.

17. The broadband access device according to claim 14, wherein the uplink port in the broadband access device is bound to the VlanPI, and messages transmitted between the broadband access device and the uplink device can be identified by the uplink ports.

* * * * *